(12) United States Patent
Toba et al.

(10) Patent No.: US 10,917,603 B2
(45) Date of Patent: Feb. 9, 2021

(54) INTERFACE CIRCUIT, TRANSMISSION SYSTEM, AND TRANSMISSION DIRECTION CONTROL METHOD

(71) Applicant: SONY CORPORATION, Tokyo (JP)

(72) Inventors: Kazuaki Toba, Kanagawa (JP); Gen Ichimura, Tokyo (JP)

(73) Assignee: SONY CORPORATION, Tokyo (JP)

(*) Notice: Subject to any disclaimer, the term of this patent is extended or adjusted under 35 U.S.C. 154(b) by 166 days.

(21) Appl. No.: 15/320,447

(22) PCT Filed: Mar. 25, 2015

(86) PCT No.: PCT/JP2015/059040
§ 371 (c)(1),
(2) Date: Dec. 20, 2016

(87) PCT Pub. No.: WO2016/002271
PCT Pub. Date: Jan. 7, 2016

(65) Prior Publication Data
US 2018/0184037 A1 Jun. 28, 2018

(30) Foreign Application Priority Data
Jul. 3, 2014 (JP) .................................. 2014-137964

(51) Int. Cl.
*G06F 13/00* (2006.01)
*H04N 5/38* (2006.01)
(Continued)

(52) U.S. Cl.
CPC ................. *H04N 5/38* (2013.01); *H04L 5/16* (2013.01); *H04N 7/104* (2013.01);
(Continued)

(58) Field of Classification Search
CPC .... H04N 5/38; H04N 7/104; H04N 21/43635; H04N 21/615; H04N 7/12; H04L 5/16; H04L 27/00; G06F 13/00
(Continued)

(56) References Cited

U.S. PATENT DOCUMENTS 5,054,019 A * 10/1991 Mathis .................... H04L 29/06
370/296
5,666,558 A * 9/1997 Pipkins ............... G06F 13/4226
710/31
(Continued)

FOREIGN PATENT DOCUMENTS

JP 2009-130606 A 6/2009

*Primary Examiner* — Trang U Tran
(74) *Attorney, Agent, or Firm* — Chip Law Group

(57) ABSTRACT

Bidirectional transmission is performed by switching transmission directions of a serial transmission path. A transmission system includes the first device that includes a transmission circuit which performs transmission to the second device through the transmission path, and a transmission direction reversal control unit which opens the transmission path after making a request for reversal of a transmission direction in the transmission path to the second device, and reverses the transmission direction at the transmission circuit in response to permission for reversal from the second device. The second device includes a transmission circuit which performs transmission to the first device through the transmission path, and a transmission direction reversal control unit which opens the transmission path in response to the request for reversal from the first device, and, when the first device becomes accessible, gives the first device the permission for reversing the transmission direction at the second transmission circuit.

11 Claims, 13 Drawing Sheets

(51) Int. Cl.
  *H04L 5/16* (2006.01)
  *H04N 21/61* (2011.01)
  *H04N 21/4363* (2011.01)
  *H04N 7/10* (2006.01)
  *H04N 7/12* (2006.01)

(52) U.S. Cl.
  CPC ..... *H04N 21/43635* (2013.01); *H04N 21/615* (2013.01); *H04N 7/12* (2013.01)

(58) Field of Classification Search
  USPC ............ 710/31; 375/295, 296; 348/723, 725
  See application file for complete search history.

(56) References Cited

U.S. PATENT DOCUMENTS

| | | | | |
|---|---|---|---|---|
| 6,006,284 | A * | 12/1999 | Cockroft | G06F 13/102 710/14 |
| 6,625,670 | B1 * | 9/2003 | Nilsson | G06F 13/387 709/220 |
| 7,626,954 | B2 * | 12/2009 | Saito | G09G 5/006 370/282 |
| 7,706,309 | B2 * | 4/2010 | Shibata | H04L 5/16 370/276 |
| 8,363,748 | B2 * | 1/2013 | Takeuchi | H04L 5/1415 375/295 |
| 2013/0314103 | A1 * | 11/2013 | Nakagawa | H04B 3/46 324/613 |

* cited by examiner

FIG.2

| PIN NUMBER | SIGNAL NAME |
|---|---|
| 1 | TMDS DATA 2 POSITIVE ELECTRODE |
| 2 | TMDS DATA 2 SHIELD |
| 3 | TMDS DATA 2 NEGATIVE ELECTRODE |
| 4 | TMDS DATA 1 POSITIVE ELECTRODE |
| 5 | TMDS DATA 1 SHIELD |
| 6 | TMDS DATA 1 NEGATIVE ELECTRODE |
| 7 | TMDS DATA 0 POSITIVE ELECTRODE |
| 8 | TMDS DATA 0 SHIELD |
| 9 | TMDS DATA 0 NEGATIVE ELECTRODE |
| 10 | TMDS CLOCK POSITIVE ELECTRODE |
| 11 | TMDS CLOCK SHIELD |
| 12 | TMDS CLOCK NEGATIVE ELECTRODE |
| 13 | CEC |
| 14 | Utility |
| 15 | SCL (DDC SERIAL CLOCK) |
| 16 | SDA (DDC SERIAL DATA) |
| 17 | DDC/CEC GROUNDING |
| 18 | POWER SUPPLY (+5V) |
| 19 | HPD (HOT PLUG DETECT) |

| OFFSET | ATTRIBUTE | NAME | CONTENT |
|---|---|---|---|
| 0x0X | R/W | TMDS TRANSMISSION DIRECTION REVERSAL REQUEST | WHEN SET BY SYNC DEVICE, CLEARED BY SYNC DEVICE AFTER HAVING BEEN READ FROM SOURCE DEVICE. AT TIME POINT OF BEING SET BY SOURCE DEVICE, ACTIVATION IS FINISHED. |

FIG. 7a

| OFFSET | BIT #7 | BIT #6 | BIT #5 | BIT #4 | BIT #3 | BIT #2 | BIT #1 | BIT #0 |
|---|---|---|---|---|---|---|---|---|
| 0x0X | Rev Req | — | — | — | — | — | — | — |

FIG. 7b

| OFFSET | BIT #7 | BIT #6 | BIT #5 | BIT #4 | BIT #3 | BIT #2 | BIT #1 | BIT #0 |
|---|---|---|---|---|---|---|---|---|
| 0x0X | Rev Req | Rev Req Return | — | — | — | — | — | — |

FIG. 7c

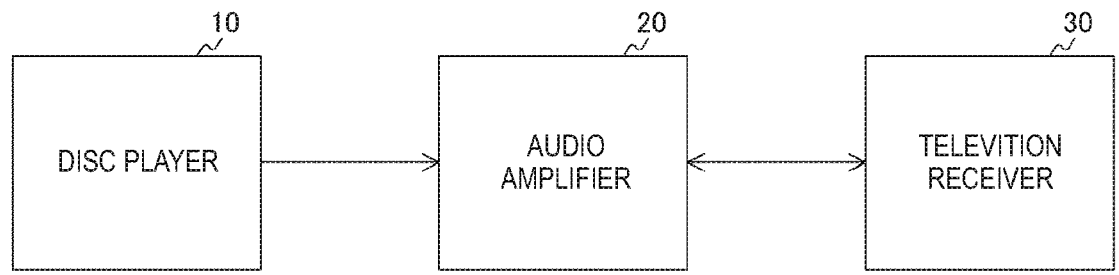
FIG. 10a
(AUDIO SIGNAL) ⟶ <PLAY AUDIO>
(VIDEO SIGNAL) ⟶ <PLAY VIDEO>
FIG. 10b
<PLAY AUDIO> ⟵ (AUDIO SIGNAL)
(VIDEO SIGNAL)
<PLAY VIDEO>
FIG. 10c

INTERFACE CIRCUIT, TRANSMISSION SYSTEM, AND TRANSMISSION DIRECTION CONTROL METHOD

CROSS REFERENCE TO RELATED APPLICATIONS

This application is a U.S. National Phase of International Patent Application No. PCT/JP2015/059040 filed on Mar. 25, 2015, which claims priority benefit of Japanese Patent Application No. JP 2014-137964 filed in the Japan Patent Office on Jul. 3, 2014. Each of the above-referenced applications is hereby incorporated herein by reference in its entirety.

TECHNICAL FIELD

The present technology relates to a transmission system which performs transmission between devices through a transmission path. Specifically, the present technology relates to an interface circuit which controls a transmission direction in a transmission path, a transmission system, processing methods therein, and programs which cause a computer to execute the methods.

BACKGROUND ART

In recent years, with the spread of audio/visual (AV) devices which process digital signals, such as sound signals, video signals, and the like, interfaces employing a variety of methods have been suggested as interfaces for transmitting digital signals between such AV devices. As such an interface, for example, high-definition multimedia interface (HDMI) standard (HDMI is a registered trademark) is widely known. In an interface such as HDMI, a unidirectional serial transmission path is used to transmit a large amount of data at high speed (for example, see Patent Literature 1).

CITATION LIST

Patent Literature

Patent Literature 1: JP 2009-130606A

SUMMARY OF INVENTION

Technical Problem

In the related art described above, a unidirectional serial transmission path is used. Therefore, in order to perform high speed transmission in two directions, it is necessary to provide a plurality of interfaces. These days, provision of content through a network is increasing, and, for example, when a television receiver acquires content from a network and plays the content, there is a use case of desiring to return high-quality audio to an amplifier side. In HDMI, a function of transmitting audio in a reverse direction through an audio return channel (ARC) has been defined already, but neither transmission of data requiring a broadband nor transmission of multichannel LPCM are supported.

The present technology has been created in consideration of such a situation, and intends to perform bidirectional transmission by switching transmission directions of a serial transmission path.

Solution to Problem

The present technology has been made in view of solving the above problem, and a first aspect thereof provides an interface circuit including: a transmission circuit configured to perform transmission to another device through a transmission path; and a transmission direction reversal control unit configured to open the transmission path after making a request for reversal of a transmission direction in the transmission path to the other device, and to reverse the transmission direction at the transmission circuit in response to permission for reversal from the other device, a transmission direction control method for the interface circuit, and a program. With this, by making a request for reversal of a transmission direction in a transmission path, the effect of reversing the transmission direction is achieved.

Further, in the first aspect, while the transmission circuit transmits data to the other device, the transmission direction reversal control unit may make the request for reversal to the other device. Further, when the request for reversal is received from the other device while the transmission circuit transmits data to the other device, the transmission direction reversal control unit may make the request for reversal to the other device. Moreover, the transmission circuit may include an amplifier alternating-current connected to a differential input from the transmission path.

Further, a second aspect of the present technology provides an interface circuit including: a transmission circuit configured to perform transmission to another device through a transmission path; and a transmission direction reversal control unit configured to open the transmission path in response to a request for reversal of a transmission direction in the transmission path from the other device and, when the other device becomes accessible again, give the other device permission for reversal and reverse the transmission direction at the transmission circuit, a transmission direction control method for the interface circuit, and a program. With this, the effect of reversing the transmission direction is achieved in response to a request for reversal of a transmission direction in a transmission path. Here, the transmission circuit may include an amplifier which is alternating-current connected to a differential output to the transmission path.

Further, in the second aspect, while the transmission circuit receives data from the other device, the transmission direction reversal control unit may receive the request for reversal from the other device. Further, while the transmission circuit receives data from the other device, the transmission direction reversal control unit may make the request for reversal to the other device.

Further, a third aspect of the present technology provides a transmission system including: a first device; and a second device, the first device and the second device performing transmission to each other through a transmission path. The first device includes a first transmission circuit configured to perform transmission to the second device through the transmission path, and a first transmission direction reversal control unit configured to open the transmission path after making a request for reversal of a transmission direction in the transmission path to the second device, and to reverse the transmission direction at the first transmission circuit in response to permission for reversal from the second device, and the second device includes a second transmission circuit configured to perform transmission to the first device through the transmission path, and a second transmission direction reversal control unit configured to open the transmission path in response to the request for reversal from the first device, and, when the first device becomes accessible again, to give the first device the permission for reversal and to reverse the transmission direction at the second transmission circuit. With this, a first device makes a request for reversal of a transmission direction in a transmission path, and a second device gives permission for reversal so that the effect of reversing the transmission direction is achieved.

Advantageous Effects of Invention

According to the present technology, it is possible to achieve an excellent effect of being able to perform bidirectional transmission by switching transmission directions of a serial transmission path. Also, effects stated herein are not necessarily limited, and any effects stated in the present disclosure may exist.

BRIEF DESCRIPTION OF DRAWINGS

FIG. 2 is a diagram showing an example of a pin arrangement of a connector in accordance with an embodiment of the present technology.

FIGS. 7a, 7b and 7c are a diagram showing an example of a format of a TMDS transmission direction reversal requesting register in accordance with an embodiment of the present invention.

FIGS. 10a, 10b and 10c are a diagram showing an example of a configuration of an audiovisual system in accordance with an embodiment of the present technology.

DESCRIPTION OF EMBODIMENT(S)

Hereinafter, a mode for implementing the present technology (referred to as an embodiment below) will be described. Description will be made in the following order.
1. Embodiment (example of transmission direction reversal control)
2. Application example 1. Embodiment

Figure 1:
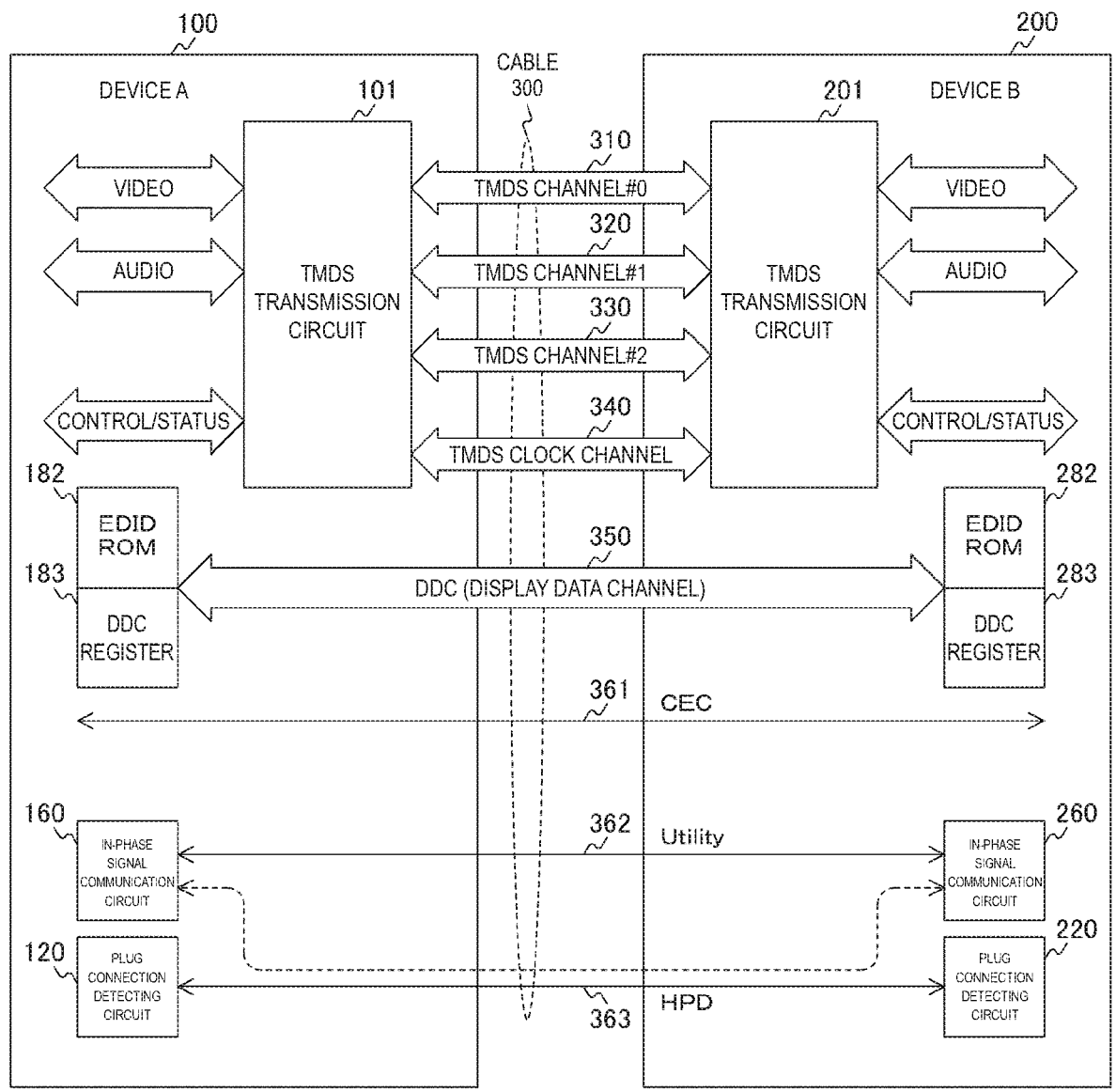
FIG. 1 is a conceptual configuration diagram of a transmission system in accordance with an embodiment of the present technology.

[Interface]
FIG. 1 is a conceptual configuration diagram of a transmission system in accordance with an embodiment of the present technology. This transmission system adopts an HDMI standard as a basic configuration and has a function of switching transmission directions of transition minimized differential signaling (TMDS) transmission. In the HDMI standard, one direction is determined as a transmission direction according to a basic high-speed transmission line, and a device on a transmitting side and a device on a receiving side are referred to as a source device and a sync device, respectively. In this example, device A 100 and device B 200 are connected by means of a cable 300. When device A 100 is the source device, device B 200 is the sync device, and when device B 200 is the source device, device A 100 is the sync device.

Device A 100 and device B 200 respectively include TMDS transmission circuits 101 and 201. When device A 100 is the source device, the TMDS transmission circuit 101 functions as a transmitter, and the TMDS transmission circuit 201 functions as a receiver. On the other hand, when device B 200 is the source device the TMDS transmission circuit 201 functions as the transmitter, and the TMDS transmission circuit 101 functions as the receiver. The TMDS transmission circuit 101 is an example of a transmission circuit or a first transmission circuit stated in the claims. Also, the TMDS transmission circuit 201 is an example of a transmission circuit or a second transmission circuit stated in the claims.

A serial transmission method based on TMDS is used in transmission between the TMDS transmission circuits 101 and 201. Like in the HDMI standard, video signals and sound signals are transmitted using three TMDS channels 310 to 330. In other words, in a valid image period which is a period from a vertical synchronizing signal to a subsequent vertical synchronizing signal excluding a horizontal retrace period and a vertical retrace period, a differential signal corresponding to pixel data of an image of one uncompressed screen is transmitted to the sync device in one direction through the TMDS channels 310 to 330. Also, in the horizontal retrace period or the vertical retrace period, a differential signal corresponding to sound data, control data, other auxiliary data, or the like is transmitted to the sync device in one direction through the TMDS channels 310 to 330.

Like in the HDMI standard, a clock signal is transmitted through a TMDS clock channel 340. It is assumed that pixel data of 10 bits is transmitted through each of the TMDS channels 310 to 330 during one clock transmitted through the TMDS clock channel 340.

Like in the HDMI standard, a display data channel (DDC) 350 is provided. The DDC 350 is originally used for a source device to read E-EDID information stored in an EDID ROM 182 or 282 of the sync device. When the sync device is a display device, the enhanced extended display identification data (E-EDID) information represents information related to settings and performance, such as a type, a resolution, color characteristics, timing, and the like of the display device. The E-EDID information is retained in the EDID ROM 182 or 282 of the sync device. Also, as registers of address space which can be accessed through the DDC 350, device A 100 and device B 200 respectively include DDC registers 183 and 283.

Further, like in the HDMI standard, a consumer electronics control (CEC) line 361, a utility line 362, a hot plug detect (HPD) line 363, and the like are provided. The CEC line 361 is a line for performing bidirectional communication of device control signals. While the DDC 350 connects devices on a one-to-one basis, the CEC line 361 is shared among all devices connected to an interface for communication.

The HPD line 363 is a line for detecting a connection (a hot plug) with another device through the cable 300. As circuits which detect a connection of the HPD line 363, device A 100 and device B 200 respectively include plug connection detecting circuits 120 and 220. In a HDMI 1.4 standard, an audio return channel (ARC) which transmits audio signals as a synchronization signal from a sync device to a source device using the utility line 362 and the HPD line 363 is defined. As circuits which realize the ARC, device A 100 and device B 200 respectively include in-phase signal communication circuits 160 and 260.

FIG. 2 is a diagram showing an example of a pin arrangement of a connector in accordance with an embodiment of the present technology. This example of a pin arrangement is in accordance with correspondence relationships between pin numbers 301 and signal names 302 which are A type of the HDMI standard.

Each of the TMDS channels 310 to 330 and the TMDS clock channel 340 includes three pins, that is, a positive electrode pin, a shield pin, and a negative electrode pin. Pins number one to number three, pins number four to number six, pins number seven to number nine, and pins number 10 to number 12 correspond to the TMDS channel 330, the TMDS channel 320, the TMDS channel 310, and the TMDS clock channel 340, respectively.

Pins number 13, number 14, and number 19 correspond to the CEC line 361, the utility line 362, and the HPD line 363, respectively. Also, the DDC 350 includes three pins, that is, a serial clock (SCL) pin, a serial data (SDA) pin, and an earthing (ground) pin, which correspond to pins number 15 to number 17 respectively. A ground connection (the pin number 17) of the DDC 350 is also used as a ground connection of the CEC line 361. A pin number 18 corresponds to a power supply line (+5V).

[Control for Reversal of Transmission Direction]

Figure 3:
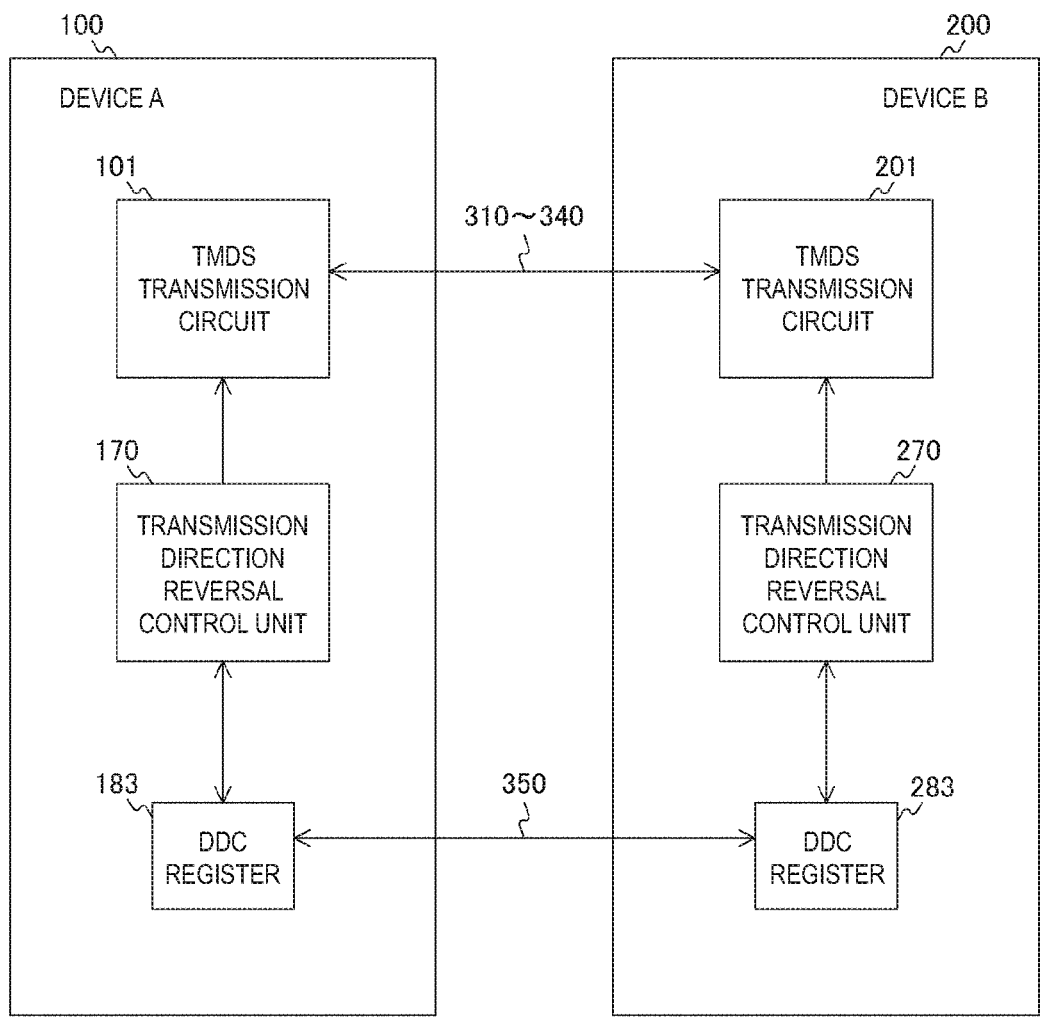
FIG. 3 is a diagram showing an example of a functional configuration required to control reversal of a transmission direction in accordance with an embodiment of the present invention.

FIG. 3 is a diagram showing an example of a functional configuration required to control reversal of a transmission direction in accordance with an embodiment of the present invention.

As described above, device A 100 includes the TMDS transmission circuit 101. Device A 100 includes a transmission direction reversal control unit 170 in order to control a transmission direction of the TMDS transmission circuit 101. Also, the aforementioned DDC register 183 is used in order to exchange information required to control the transmission direction reversal control unit 170 with device B 200. As described above, device B 200 also includes the TMDS transmission circuit 201. Device B 200 includes a transmission direction reversal control unit 270 in order to control a transmission direction of the TMDS transmission circuit 201. Also, the aforementioned DDC register 283 is used in order to exchange information required to control the transmission direction reversal control unit 270 with device A 100.

In the HDMI standard, a transmission direction of TMDS channel #0 310, TMDS channel #1 320, TMDS channel #2 330, and the TMDS clock channel 340 (these four channels will be generally referred to as TMDS channels below) is fixed in one direction. In contrast, this embodiment is configured to be able to appropriately reverse the transmission direction. In other words, when one of device A 100 and device B 200 serves as the source device, the other one serves as the sync device. A transmission direction of the TMDS channels is set to one direction from the source device to the sync device. Therefore, when device A 100 and device B 200 switch their roles, the transmission direction of the TMDS channels are reversed between device A 100 and device B 200.

The DDC registers 183 and 283 are registers which can be accessed through the DDC 350. In this embodiment, TMDS transmission direction reversal requesting registers are defined in the DDC registers 183 and 283 and accessed by the transmission direction reversal control unit 170 of device A 100 and the transmission direction reversal control unit 270 of device B 200 so that reversal of the transmission direction is controlled. Details of a control procedure according to these transmission direction reversal control units 170 and 270 will be described below. The transmission direction reversal control unit 170 is an example of a transmission direction reversal control unit or a first transmission direction reversal control unit stated in the claims. Also, the transmission direction reversal control unit 270 is an example of a transmission direction reversal control unit or a second transmission direction reversal control unit stated in the claims.

Figure 4:
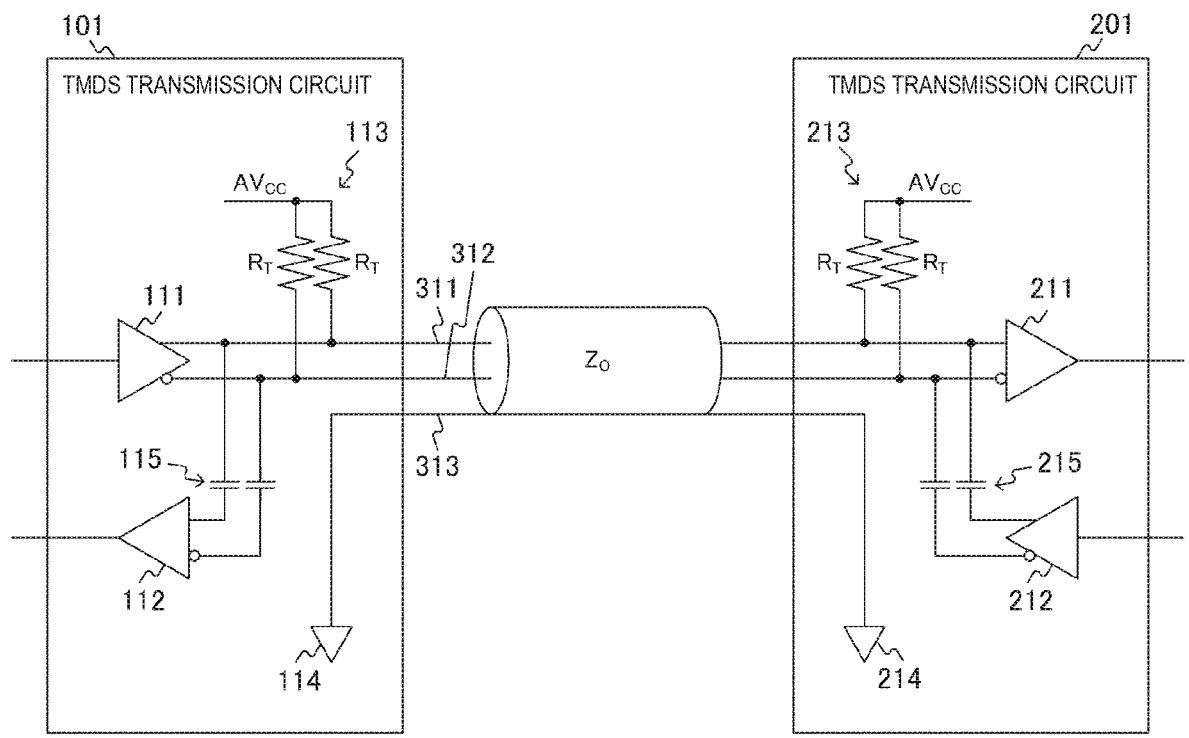
FIG. 4 is a diagram showing examples of configurations of TMDS transmission circuits 101 and 201 in accordance with an embodiment of the present invention.

FIG. 4 is a diagram showing examples of configurations of the TMDS transmission circuits 101 and 201 in accordance with an embodiment of the present invention. Here, description will be focused on TMDS channel #0 310 as a transmission path. TMDS channel #0 310 is made up of a positive electrode signal line 311, a negative electrode signal line 312, and a shield signal line 313. This is the same for the other TMDS channels.

The TMDS transmission circuit 101 includes amplifiers 111 and 112, a direct current bias circuit 113, and a shield terminal 114. The amplifier 111 is an amplifier which amplifies an input signal. An output of the amplifier 111 is a differential signal, and a positive electrode signal and a negative electrode signal are respectively supplied to the positive electrode signal line 311 and the negative electrode signal line 312. The amplifier 112 is an amplifier which amplifies a signal from the TMDS channels. The amplifier 112 operates due to a differential input, and the positive electrode signal line 311 and the negative electrode signal line 312 are input to an input of the positive electrode and an input of the negative electrode, respectively. The direct current bias circuit 113 is a circuit which places a bias voltage on the TMDS channels which are differential signal lines. In the HDMI standard, the direct current bias circuit 113 is provided on a receiver side which receives a differential signal. The shield terminal 114 is a terminal for grounding and is connected to the shield signal line 313.

The TMDS transmission circuit 201 includes amplifiers 211 and 212, a direct current bias circuit 213, and a shield terminal 214. A configuration thereof is identical to the configuration of the TMDS transmission circuit 101. Both of the direct current bias circuits 113 and 213 are provided in this example, but it is also possible to provide only one.

When a default configuration of the TMDS transmission circuit 101 is the source device, the amplifier 112 may be alternating current (AC)-connected to a differential input through condensers 115. In this way, it is possible to reduce a load on a transmission path during a default operation. Likewise, when a default configuration of the TMDS transmission circuit 201 is the sync device, the amplifier 212 may be AC-connected to a differential output through condensers 215. In this way, it is possible to reduce a load on a transmission path during the default operation.

Figure 5:
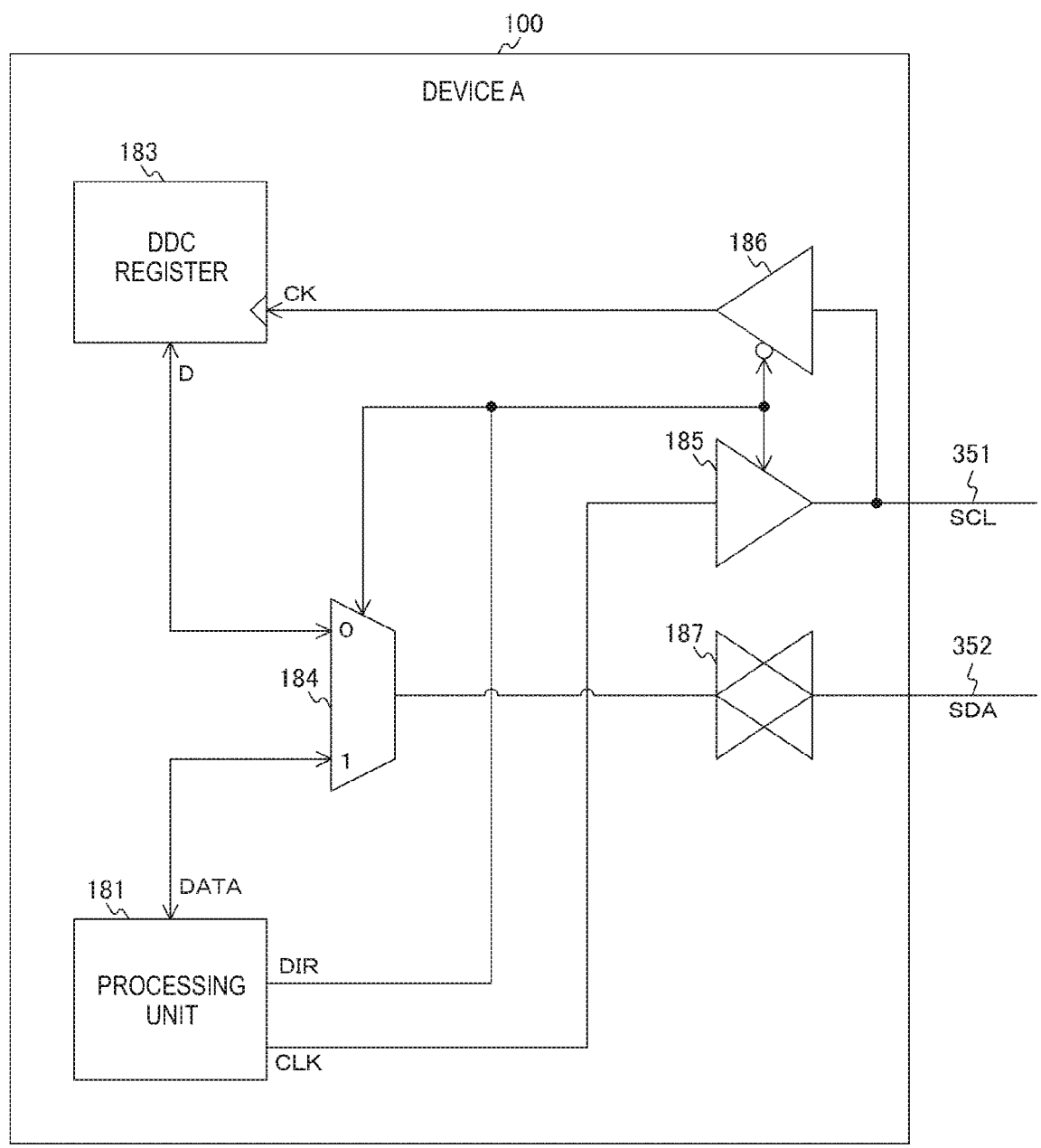
FIG. 5 is a diagram showing an example of a configuration of device A 100 in accordance with an embodiment of the present technology.
Figure 6:
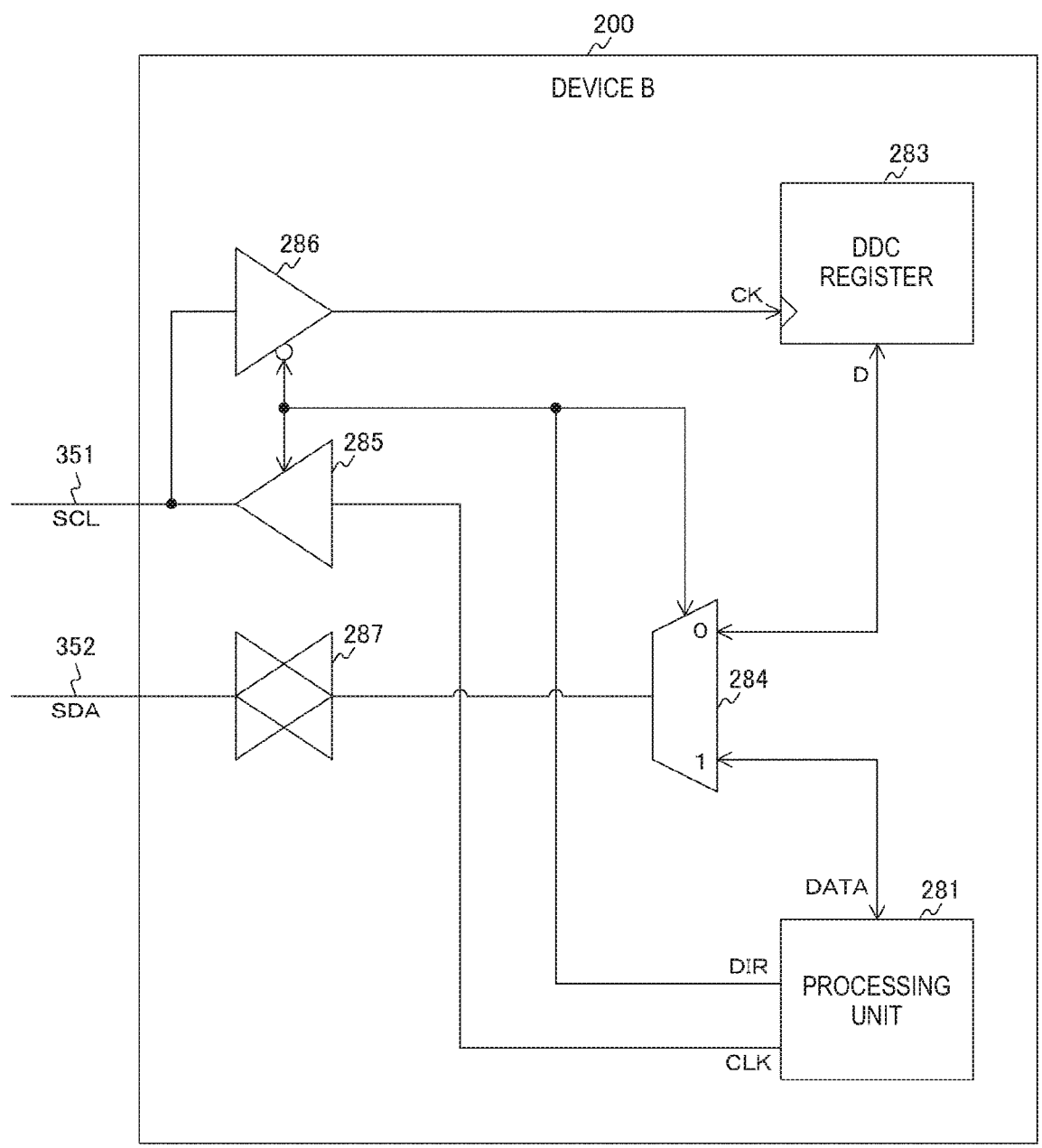
FIG. 6 is a diagram showing an example of a configuration of device B 200 in accordance with an embodiment of the present technology.

FIG. 5 is a diagram showing an example of a configuration of device A 100 in accordance with an embodiment of the present technology. FIG. 6 is a diagram showing an example of a configuration of device B 200 in accordance with an embodiment of the present technology. Here, a state in which device A 100 and device B 200 are connected through an SCL line 351 and an SDA line 352 is shown. Also, ground lines are omitted.

Device A 100 includes a processing unit 181, the DDC register 183, a selector 184, and drivers 185 to 187. Likewise, device B 200 includes a processing unit 281, the DDC register 283, a selector 284, and drivers 285 to 287.

When data is transmitted from device A 100 to device B 200, device A 100 is a master, and "1" is output as a transmission direction signal DIR from the processing unit 181. With this, the driver 185 operates, and the output of the driver 186 becomes high impedance. For this reason, a clock signal CLK from the processing unit 181 is output to the SCL line 351. Also, the selector 184 selects a data signal DATA from the processing unit 181. For this reason, the data signal DATA is output to the SDA line 352 through the driver 187.

In this case, device B 200 is a slave, and "0" is output as a transmission direction signal DIR from the processing unit 281. With this, the driver 286 operates, and the output of the driver 285 becomes high impedance. For this reason, a value of the SCL line 351 is input to the DDC register 283 as a clock signal CK. Also, the selector 284 connects a value of the SDA line 352 to the DDC register 283 as a data signal D. For this reason, the DDC register 283 retains or outputs the data signal D according to the clock signal CK.

On the other hand, when data is transmitted from device B 200 to device A 100, device B 200 is the master, and "1" is output as the transmission direction signal DIR from the processing unit 281. Also, in this case, device A 100 is the slave, and "0" is output as the transmission direction signal DIR from the processing unit 181. In other words, device A 100 and device B 200 perform operations opposite to the case described above.

In this way, the DDC 350 is bidirectional, and information required to control reversal of the transmission direction of the TMDS channels can be exchanged between device A 100 and device B 200.

[TMDS Transmission Direction Reversal Requesting Register]

FIGS. 7*a*, 7*b* and 7*c* are a diagram showing an example of a format of a TMDS transmission direction reversal requesting register in accordance with an embodiment of the present invention. This TMDS transmission direction reversal requesting register is defined in each of the DDC registers 183 and 283. Whether or not the TMDS transmission direction reversal requesting register is valid and has a function of reversing the transmission direction of the TMDS channels is defined in a capability declarative data structure of EDID and the like. Therefore, by referring to the EDID ROMs 182 and 282, it is possible to determine whether or not the TMDS transmission direction reversal requesting register has the function.

As shown in 7*a* of the drawing, the TMDS transmission direction reversal requesting register is assumed to be defined at an offset "0x0X" of the DDC registers 183 and 283. Also, attributes of access can be both of read and write.

As shown in 7*b* of the drawing, the TMDS transmission direction reversal requesting register has a TMDS transmission direction reversal requesting flag RevReq. When the transmission direction is changed from a forward direction to a backward direction, a TMDS transmission direction reversal requesting flag of a TMDS transmission direction reversal requesting register implemented in a sync device is used. On the other hand, when the transmission direction is changed from the backward direction to a forward direction, a TMDS transmission direction reversal requesting flag of a TMDS transmission direction reversal requesting register implemented in a source device is used.

When the TMDS transmission direction reversal requesting flag is set by the sync device, the TMDS transmission direction reversal requesting flag is read by the source device and then cleared by the sync device. Also, activation is finished at a point in time at which the TMDS transmission direction reversal requesting flag is set by the source device.

As shown in 7*c* of the drawing, the TMDS transmission direction reversal requesting flag RevReq provided to the sync device and a TMDS transmission direction reversal requesting flag RevReqReturn provided to the source device may be separately assigned.

[Operation]

Figure 8:
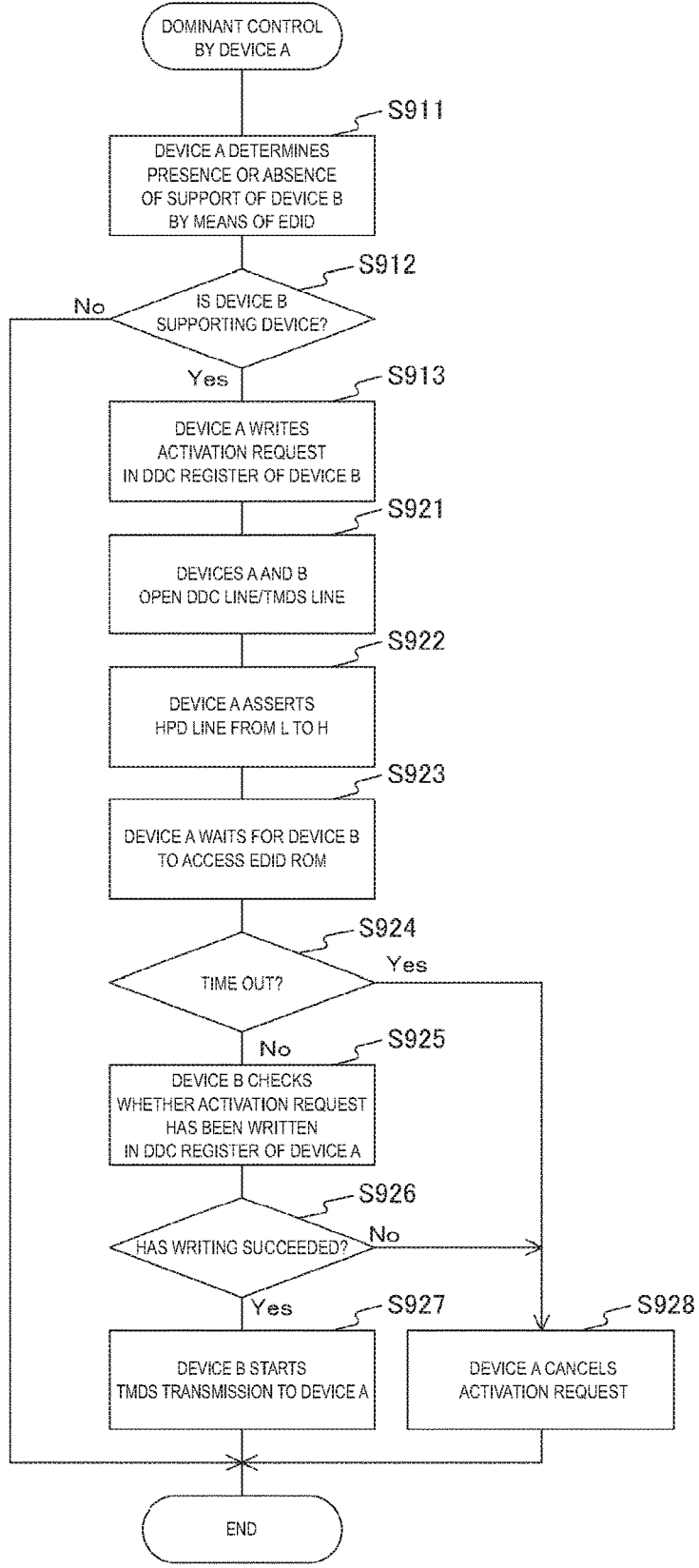
FIG. 8 is a flowchart showing an example of a processing procedure when a source device dominantly controls reversal of a TMDS transmission direction in accordance with an embodiment of the present invention.

FIG. 8 is a flowchart showing an example of a processing procedure when a source device dominantly controls reversal of a TMDS transmission direction in accordance with an embodiment of the present invention. Here, when device A 100 operates as a source device and device B 200 operates as a sync device, it is assumed that device A 100 dominantly reverses a transmission direction as the source device.

First, device A 100 determines whether or not device B 200 supports a TMDS transmission direction reversal control function by referring to the EDID ROM 282 of device B 200 through the DDC 350 (step S911). As a result, when device B 200 does not support the TMDS transmission direction reversal control function, reversal of the transmission direction is considered to be impossible and the process ends (step S912: No). When device B 200 supports the TMDS transmission direction reversal control function (step S912: Yes), the following process is performed.

By setting a TMDS transmission direction reversal requesting flag of a TMDS transmission direction reversal requesting resister in the DDC register 283 of device B 200, device A 100 requests activation of reversal (step S913). After this request, device A 100 opens the DDC 350 and the TMDS channels and stops driving each signal line (step S921). Likewise, device B 200, which detects the reversal request from device A 100, also opens the DDC 350 and the TMDS channels and stops driving each signal line (step S921). In this way, each configuration of device A 100 and device B 200 changes, and device B 200 and device A 100 are respectively configured as the source device and the sync device.

After device A 100 is configured as the sync device, device A 100 accesses the HPD line 363 (step S922). In this way, device B 200 is notified that it is possible to access the EDID ROM 182 of device A 100.

Device A 100 waits until device B 200 starts accessing the EDID ROM 182 (step S923). When device B 200 accesses the EDID ROM 182, it is possible to detect that the configuration of device B 200 has been changed to the source device. When a predetermined time elapses until the EDID ROM 182 is accessed (step S924: Yes), it is determined that the configuration of device B 200 has not been changed to the source device. In this case, device A 100 cancels the request for activation of reversal and returns to the configuration of the source device (step S928). After that, device A 100 waits for device B 200 to assert the HPD line 363 and ends this process.

When device B 200 accesses the EDID ROM 182 within the predetermined time (step S924: No), it is checked in succession whether or not the TMDS transmission direction reversal requesting flag has been set in the DDC register 183 (step S925). At this time, if it is not possible to check that the TMDS transmission direction reversal requesting flag has been set in the DDC register 183 even after a certain time (step S926: No), like the above description, device A 100 cancels the request for activation of reversal and returns to the configuration of the source device (step S928).

When the TMDS transmission direction reversal requesting flag has been set in the DDC register 183 (step S926: Yes), device B 200 becomes the source device and starts transmission in which device A 100 is considered as the sync device (step S927).

Figure 9:
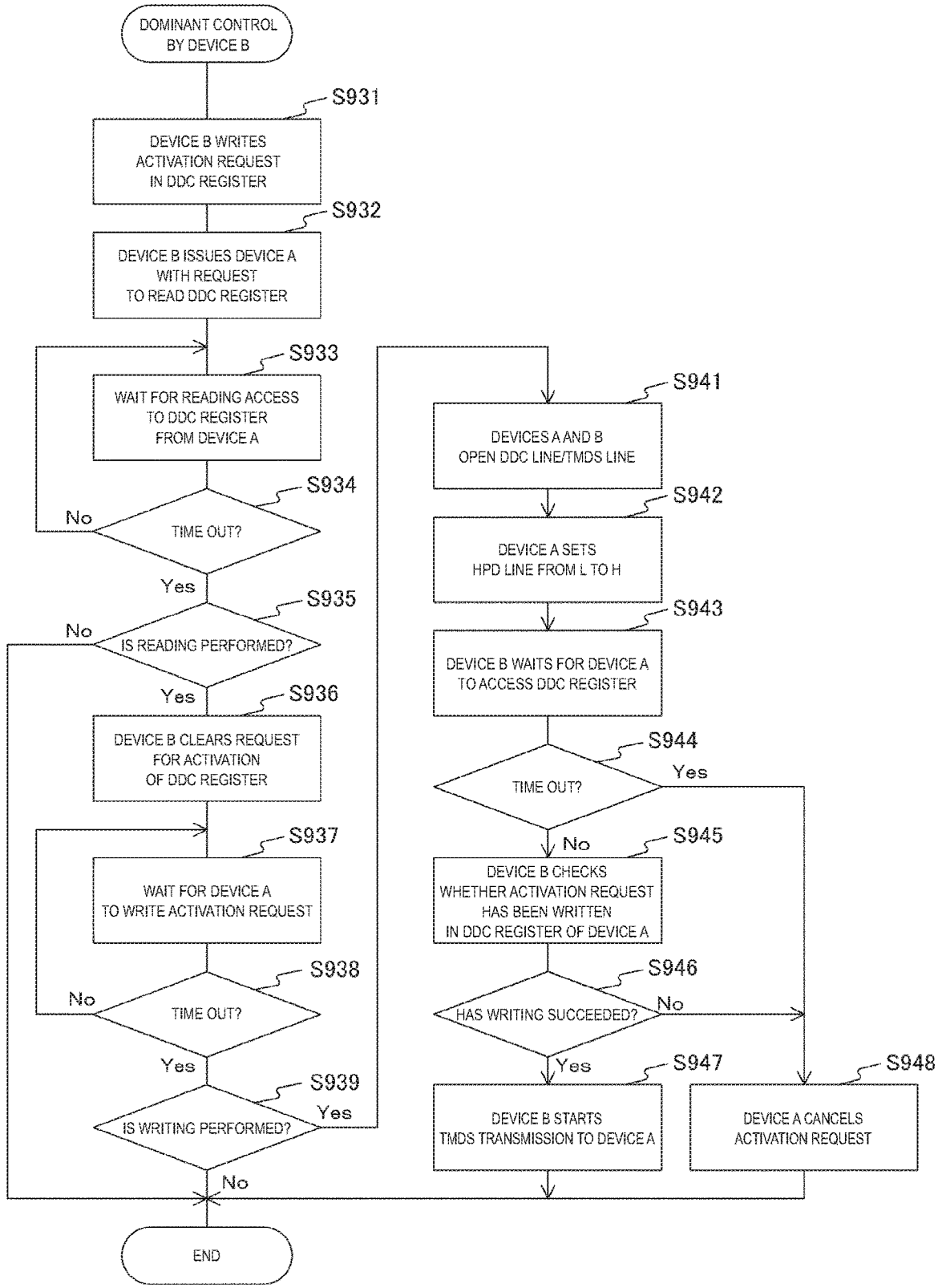
FIG. 9 is a flowchart showing an example of a processing procedure when a sync device dominantly controls reversal of a TMDS transmission direction in accordance with an embodiment of the present invention.

FIG. 9 is a flowchart showing an example of a processing procedure when a sync device dominantly controls reversal of a TMDS transmission direction in accordance with an embodiment of the present invention. Here, when device A 100 operates as a source device and device B 200 operates as a sync device, it is assumed that device B 200 dominantly reverses a transmission direction as the sync device. This process is started, for example, when a user instructs device B 200 to play content using a remote controller of device B 200 or device A 100 is supplied with power and newly instructed to play sound in device A 100.

Device B 200 is a slave in DDC communication as the sync device, and thus first sets a value in a TMDS transmission direction reversal requesting flag of a TMDS transmission direction reversal requesting register implemented therein by itself (step S931). After that, device B 200 requests device A 100 to read the TMDS transmission direction reversal requesting register of device B 200 (step S932). This read request may use a means of communication other than a DDC communication path or may be implemented by exchanging in advance special signals which can be recognized between device A 100 and device B 200 on a DDC communication path but are not prescribed in I2C communication.

After that, device B 200 waits until the TMDS transmission direction reversal requesting register is read by device A 100 (step S933). At this time, if reading is not performed even after a certain time (step S934: Yes and step S935: No), this activation process is considered to have failed and ends. In this case, for example, a message indicating that it is not possible to use the transmission direction reversal function may be displayed on a display for the user. Also, device B 200 may make a read request again without ending the process.

When reading is performed by device A 100, device B 200 determines that device A 100 has accepted the activation request from device B 200 and clears the TMDS transmission direction reversal requesting flag set by device B 200 (step S936).

Device A provides a response to the request from device B 200 by setting an activation request flag in the TMDS transmission direction reversal requesting register of device B 200 in consideration of a capability thereof. This register may be identical to the aforementioned register or may uniquely have a different address.

Device B 200 waits until device A 100 performs writing in the register as a response to the activation request (step S937). At this time, if writing is not performed even after a certain time (step S938: Yes and step S939: No), it is determined that device A 100 does not support the TMDS transmission direction reversal function, and the process ends. In this case, some messages may be displayed on the display for the user.

When writing is performed by device A 100 (step S939: Yes), it is determined that activation with device A 100 has been finished, and the process of step S941 and the following steps is executed. Since the process of step S941 and the following steps is identical to the process of step S921 and the following steps in the process described in FIG. 8, the description will be omitted here.

As described above, according to an embodiment of the present technology, it is possible to control reversal of a transmission direction of a TMDS channel by requesting reversal of a TMDS transmission direction and responding to the request through the DDC 350.

2. Application Example

In the embodiment described above, control for reversal of a transmission direction based on the HDMI standard has been described, but the present technology can also be applied to other configurations. As application examples of the present technology, examples of configurations of an audiovisual system, a disc player, a television receiver, and a digital camera will be described here.

FIG. 10a, 10b, 10c are a diagram showing an example of a configuration of an audiovisual system in accordance with an embodiment of the present technology. As shown in 10a of the drawing, this audiovisual system includes a disc player 10, an audio amplifier 20, and a television receiver 30.

As shown in 10b of the drawing, the disc player 10 plays content recorded on a disk medium and generates a video signal and an audio signal. Then, the audio signal is played by the audio amplifier 20, and sound is output from a speaker (not shown). Also, the video signal is played by the television receiver 30 and displayed on a display of the television receiver 30. In this case, the disc player 10 is a source device, and the audio amplifier 20 and the television receiver 30 operate as sync devices.

On the other hand, when a broadcast signal received in the television receiver 30 is played, as shown in 10c of the drawing, there is a case in which a video signal is requested to be played as it is in the television receiver 30 and an audio signal is requested to be played in the audio amplifier 20. In this case, in relation to the audio signal, the television receiver 30 is the source device, and the audio amplifier 20 operates as the sync device. For this reason, in an interface of the related HDMI standard, it is not possible to respond to such a request without physically breaking a connection because of a different transmission direction. In this respect, according to an embodiment of the present technology, it is possible to reverse the transmission direction without physically breaking the connection, and thus the audio amplifier 20 can play audio signals supplied from the television receiver 30.

Figure 11:
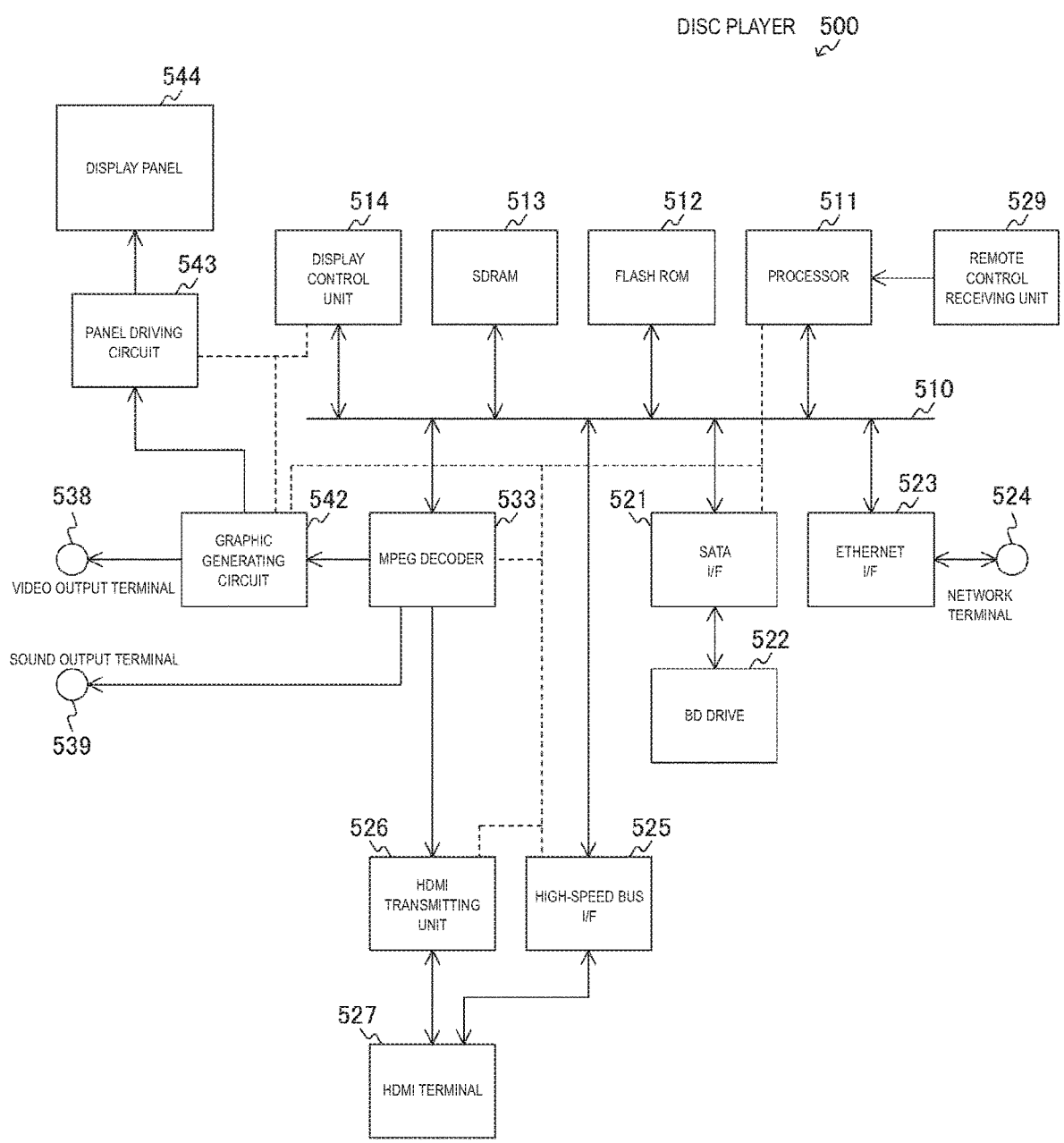
FIG. 11 is a diagram showing an example of a configuration of a disc player 500 in accordance with an embodiment of the present technology.

FIG. 11 is a diagram showing an example of a configuration of a disc player 500 in accordance with an embodiment of the present technology. This disc player 500 includes a processor 511, a flash ROM 512, an SDRAM 513, and a display control unit 514. Also, the disc player 500 includes a SATA interface 521, a BD drive 522, an Ethernet (registered trademark) interface 523, and a network terminal 524. Also, the disc player 500 includes a high-speed bus interface 525, an HDMI transmitting unit 526, an HDMI terminal 527, and a remote control receiving unit 529. Also, the disc player 500 includes an MPEG decoder 533, a video output terminal 538, and a sound output terminal 539. Also, the disc player 500 includes a graphic generating circuit 542, a panel driving circuit 543, and a display panel 544. The processor 511, the flash ROM 512, the SDRAM 513, the display control unit 514, the SATA interface 521, the Ethernet interface 523, and the MPEG decoder 533 are mutually connected via a bus 510.

The processor 511 generally controls the disc player 500. The flash ROM 512 is a memory which stores a program and the like required for the processor 511 to operate. The SDRAM 513 is a memory which stores data and the like required for the processor 511 to operate.

The SATA interface 521 is an interface for connecting to a serial ATA. The BD drive 522 is a disk drive for driving a Blu-ray® disc. The Ethernet interface 523 is an interface for connecting to Ethernet. The network terminal 524 is a terminal for connecting to Ethernet.

The high-speed bus interface 525 is the utility line 362 and the HPD line 363 of the HDMI standard. The HDMI transmitting unit 526 is a transmission circuit for an interface of the HDMI standard. The HDMI terminal 527 is a terminal consistent with the HDMI standard.

The remote control receiving unit 529 receives a signal from a remote controller (not shown) manipulated by a user.

The MPEG decoder 533 is a decoder which decodes a signal in accordance with the MPEG standard. The video output terminal 538 is a terminal which outputs video signals. The sound output terminal 539 is a terminal which outputs sound signals.

The display control unit 514 performs control required for display on the display panel 544. The graphic generating circuit 542 generates graphic images to be displayed on the display panel 544. The panel driving circuit 543 is a circuit for driving the display panel 544. The display panel 544 is a panel which displays video. Here, the display panel 544 is assumed to be built into the disc player 500, but the disc player 500 may not have the built-in display panel 544.

The high-speed bus interface 525 is inserted between the Ethernet interface 523 and the HDMI terminal 527. The high-speed bus interface 525 transmits transmission data, which is supplied from the processor 511, from the HDMI terminal 527 to a device on the other side through an HDMI cable. Also, the high-speed bus interface 525 supplies reception data, which is received from the device on the other side through the HDMI cable and the HDMI terminal 527, to the processor 511.

During content recording, content data to be recorded is acquired through a digital tuner (not shown), the Ethernet interface 523, or the high-speed bus interface 525. The content data is input to the SATA interface 521 and recorded in a BD by the BD drive 522. The content data may be recorded in a hard disk drive (HDD) (not shown), which is connected to the SATA interface 521.

During content playback, content data (an MPEG stream) which is played from a BD by the BD drive 522 is supplied to the MPEG decoder 533 through the SATA interface 521. In the MPEG decoder 533, a decoding process is performed on the played content data, and baseband image and sound data is obtained. The image data is output to the video output terminal 538 through the graphic generating circuit 542. Also, the sound data is output to the sound output terminal 539.

Also, during the content playback, the image data obtained in the MPEG decoder 533 is supplied to the panel driving circuit 543 through the graphic generating circuit 542 in accordance with a user manipulation, and playback images are displayed on the display panel. Also, audio data obtained in the MPEG decoder 533 is supplied to a speaker (not shown) in accordance with a user manipulation, and sound corresponding to the playback images is output.

Also, during the content playback, if the image and sound data is transmitted through HDMI TMDS channels, the image and sound data is supplied to the HDMI transmitting unit 526 and packed. Then, the image and sound data is output from the HDMI transmitting unit 526 to the HDMI terminal 527.

Also, during the content playback, if the content data played by the BD drive 522 is sent to a network, the content data is output to the network terminal 524 through the Ethernet interface 523. Likewise, during the content playback, if the content data played by the BD drive 522 is sent to a bidirectional communication path of the HDMI cable, the content data is output to the HDMI terminal 527 through the high-speed bus interface 525. Before the image data is output, the image data may be encrypted using a copyright protection technology, for example, HDCP, DTCP, DTCP+, or the like, and then transmitted.

Figure 12:
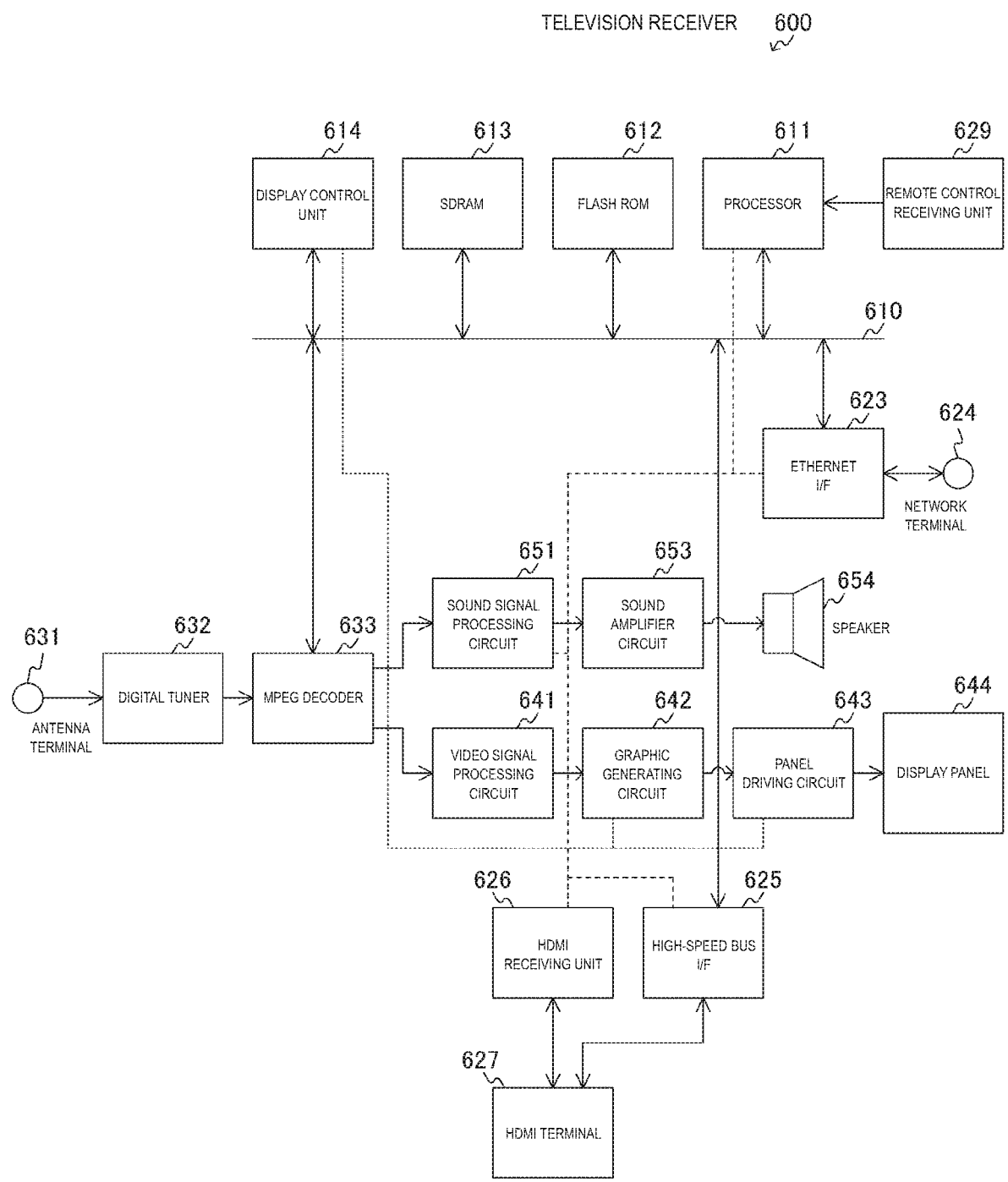
FIG. 12 is a diagram showing an example of a configuration of a television receiver 600 in accordance with an embodiment of the present technology.

FIG. 12 is a diagram showing an example of a configuration of a television receiver 600 in accordance with an embodiment of the present technology. This television receiver 600 includes a processor 611, a flash ROM 612, an SDRAM 613, and a display control unit 614. Also, the television receiver 600 includes an Ethernet interface 623 and a network terminal 624. Also, the television receiver 600 includes a high-speed bus interface 625, an HDMI receiving unit 626, an HDMI terminal 627, and a remote control receiving unit 629. Also, the television receiver 600 includes an antenna terminal 631, a digital tuner 632, and an MPEG decoder 633. Also, the television receiver 600 includes a video signal processing circuit 641, a graphic generating circuit 642, a panel driving circuit 643, and a display panel 644. Also, the television receiver 600 includes a sound signal processing circuit 651, a sound amplifier circuit 653, and a speaker 654. The processor 611, the flash ROM 612, the SDRAM 613, the display control unit 614, the Ethernet interface 623, the high-speed bus interface 625, and the MPEG decoder 633 are mutually connected via a bus 610.

The processor 611 generally controls the television receiver 600. The flash ROM 612 is a memory which stores a program and the like required for the processor 611 to operate. The SDRAM 613 is a memory which stores data and the like required for the processor 611 to operate. The display control unit 614 performs control required for display on the display panel 644.

The Ethernet interface 623 an interface for connecting to Ethernet. The network terminal 624 is a terminal for connecting to Ethernet. The high-speed bus interface 625 is the utility line 362 and the HPD line 363 of the HDMI standard. The HDMI receiving unit 626 is a transmission circuit for an interface of the HDMI standard. The HDMI terminal 627 is a terminal consistent with the HDMI standard.

The remote control receiving unit 629 receives a signal from a remote controller (not shown) manipulated by a user.

The antenna terminal 631 is a terminal to which a television broadcast signal received by a receiving antenna (not shown) is input. The digital tuner 632 processes the television broadcast signal input from the antenna terminal 631 to extract a partial TS from a predetermined transport stream corresponding to a channel selected by the user.

The MPEG decoder 633 is a decoder which decodes a signal in accordance with the MPEG standard. The MPEG decoder 633 performs a decoding process on video PES packets, which include TS packets of video data obtained by the digital tuner 632, to obtain image data. Also, the MPEG decoder 633 performs a decoding process on sound PES packets, which include TS packets of sound data obtained by the digital tuner 632, to obtain sound data.

The video signal processing circuit 641 and the graphic generating circuit 642 perform a signal process as necessary on the image data obtained by the MPEG decoder 633 or image data received at the HDMI receiving unit 626. This signal process is assumed to be, for example, a scaling process (a resolution conversion process), a graphics data superimposing process, gamma correction of a WCG image, and the like. The panel driving circuit 643 is a circuit for driving the display panel 644 on the basis of video (image) data output from the graphic generating circuit 642. The display panel 644 is a panel which displays video. The display panel 644 may be configured with, for example, a liquid crystal display (LCD), a plasma display panel (PDP), an organic electro-luminescence (EL) panel, and the like.

In this embodiment, an example including the display control unit 614 in addition to the processor 611 is shown, but the processor 611 may directly control a display on the display panel 644. Also, the processor 611 and the display control unit 614 may be configured as one chip or may be a plurality of cores.

The sound signal processing circuit 651 performs a necessary process, such as D/A conversion and the like, on the sound data obtained by the MPEG decoder 633. The sound amplifier circuit 653 amplifies a sound signal output from the sound signal processing circuit 651 and supplies the amplified sound signal to the speaker 654. The speaker 654 may be monaural or stereo. The speaker 654 may be one, or two or more in number. The speaker 654 may be earphones or headphones. The speaker 654 may correspond to 2.1 channels, 5.1 channels, or the like. The speaker 654 may be wirelessly connected to the television receiver 600. The speaker 654 may be another device.

The television broadcast signal input to the antenna terminal 631 is supplied to the digital tuner 632. The digital tuner 632 processes the television broadcast signal and outputs the predetermined transport stream corresponding to the channel selected by the user. Then, the partial TS (the TS packets of video data and the TS packets of sound data) is extracted from the transport stream and supplied to the MPEG decoder 633.

In the MPEG decoder 633, a decoding process is performed on the video PES packets, which include TS packets of video data, to obtain the video data. At the video signal processing circuit 641 and the graphic generating circuit 642, the video data is subjected to a scaling process (a resolution conversion process), a graphics data superimposing process, and the like as necessary and then supplied to the panel driving circuit 643. For this reason, images corresponding to the channel selected by the user are displayed on the display panel 644.

Also, in the MPEG decoder 633, a decoding process is performed on the sound PES packets, which include TS packets of sound data, to obtain the sound data. The sound data is subjected to a necessary process, such as D/A conversion and the like, in the sound signal processing circuit 651, is also amplified in the sound amplifier circuit 653, and then is supplied to the speaker 654. For this reason, sound corresponding to the channel selected by the user is output from the speaker 654.

Content data (image data and sound data) which is supplied from the network terminal 624 to the Ethernet interface 623 or supplied from the HDMI terminal 627 through the high-speed bus interface 625 is supplied to the MPEG decoder 633. After that, the same operation as the above-described operation during reception of a television broadcast signal is performed so that images are displayed on the display panel 644 and sound is output from the speaker 654.

At the HDMI receiving unit 626, image data and sound data transmitted from the disc player 500, which is connected to the HDMI terminal 627 through an HDMI cable, is acquired. The image data is supplied to the video signal processing circuit 641. Also, the sound data is directly supplied to the sound signal processing circuit 651. After that, the same operation as the above-described operation during the reception of the television broadcast signal is performed so that images are displayed on the display panel 644 and sound is output from the speaker 654.

Figure 13:
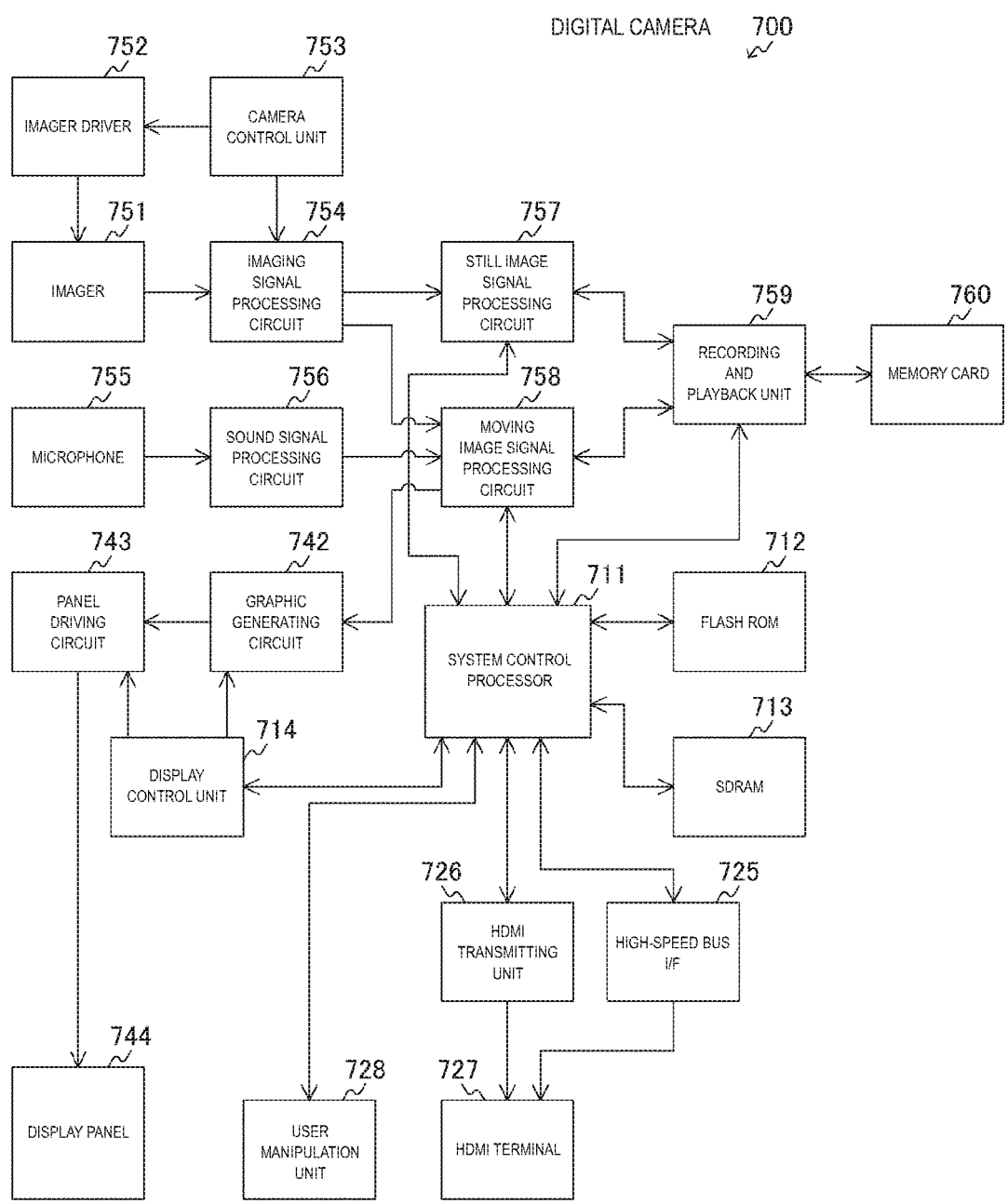
FIG. 13 is a diagram showing an example of a configuration of a digital camera 700 in accordance with an embodiment of the present technology.

FIG. 13 is a diagram showing an example of a configuration of a digital camera 700 in accordance with an embodiment of the present technology. This digital camera 700 includes a system control processor 711, a flash ROM 712, an SDRAM 713, and a display control unit 714. Also, the digital camera 700 includes a high-speed bus interface 725, an HDMI transmitting unit 726, an HDMI terminal 727, and a user manipulation unit 728. Also, the digital camera 700 includes a graphic generating circuit 742, a panel driving circuit 743, and a display panel 744. Also, the digital camera 700 includes an imager 751, an imager driver 752, and a camera control unit 753. Also, the digital camera 700 includes an imaging signal processing circuit 754, a microphone 755, a sound signal processing circuit 756, a still image signal processing circuit 757, a moving image signal processing circuit 758, a recording and playback unit 759, and a memory card 760.

The system control processor 711 generally controls the digital camera 700. The flash ROM 712 is a memory which stores a program and the like required for the system control processor 711 to operate. The SDRAM 713 is a memory which stores data and the like required for the system control processor 711 to operate. The display control unit 714 performs control required for display on the display panel 744.

The high-speed bus interface 725 is the utility line 362 and the HPD line 363 of the HDMI standard. The HDMI transmitting unit 726 is a transmission circuit for an interface of the HDMI standard. The HDMI terminal 727 is a terminal consistent with the HDMI standard.

The user manipulation unit 728 receives manipulation of a user. The user manipulation unit 728 may be, for example, a switch, a wheel, a touch panel unit which inputs an instruction by an approach/touch, a mouse, a keyboard, a gesture input unit which detects an input of an instruction with a camera, a sound input unit which inputs an instruction with voice, a remote control, and the like. The system control processor 711 determines a manipulation state of the user manipulation unit 728 and controls operation of the digital camera 700. Through the user manipulation unit 728, the user can perform an input manipulation and the like for various kinds of additional information in addition to an imaging (recording) manipulation and a playback manipulation.

The graphic generating circuit 742 generates graphic images to be displayed on the display panel 744. The panel driving circuit 742 is a circuit for driving the display panel 744. The display panel 744 is a panel which displays video.

The imager 751 is a photoelectric conversion device which converts a received optical signal into an electric signal. The imager driver 752 is a driver which drives the imager 751. The camera control unit 753 controls the imager driver 752 and the imaging signal processing circuit 754. The imaging signal processing circuit 754 performs a signal process on the electric signal supplied from the imager 751 as an imaging signal.

The microphone 755 converts ambient sound to generate a sound signal. The sound signal processing circuit 756 performs a signal process on the sound signal generated by the microphone 755.

The still image signal processing circuit 757 performs a signal process on a still image signal supplied from the imaging signal processing circuit 754. The moving image signal processing circuit 758 performs a signal process on a moving image signal supplied from the imaging signal processing circuit 754 and the sound signal processing circuit 756.

The recording and playback unit 759 accesses the memory card 760, the flash ROM 712, or the like and reads still image data or moving image data. The memory card 760 is a recording medium in which the still image data or moving image data is recorded.

An imaging signal obtained by the imager 751 is supplied to the imaging signal processing circuit 754 and processed, and image data (taken image data) corresponding to a subject is obtained from the imaging signal processing circuit 754. When a still image is taken, a compression encoding process and the like is performed on the image data output from the imaging signal processing circuit 754 in the still image signal processing circuit 757, and still image data is generated. The still image data is recorded in the memory card 760 and the like by the recording and playback unit 759.

Also, when moving images are taken, a compression encoding process and the like in accordance with a recording media format is performed on the image data output from the imaging signal processing circuit 754 together with sound data output from the sound signal processing circuit 756 in the moving image signal processing circuit 758, and moving image data to which sound data is added is generated. The moving image data is recorded in the memory card 760 and the like by the recording and playback unit 759.

When a still image is played, still image data is read from the memory card 760 or the like and subjected to a process, such as decoding and the like, in the still image signal processing circuit 757, and playback image data is obtained. The playback image data is supplied to the panel driving circuit 743 through the system control processor 711 and the moving image signal processing circuit 758, and the still image is displayed on the display panel 744.

When moving images are played, moving image data is read from the memory card 760 or the like by the recording and playback unit 759 and subjected to a process, such as decoding and the like, in the moving image signal processing circuit 758, and playback image data is obtained. Then, the playback image data is supplied to the panel driving circuit 743, and the moving images are displayed on the display panel 744.

When image or sound data associated with still image data or moving image data recorded in the memory card 760 and the like is transmitted to an external device (a sync device), the still image data or moving image data is read from the memory card 760. Then, the read still image data or moving image data is supplied to the still image signal processing circuit 757 or the moving image signal processing circuit 758 and subjected to a process, such as decoding and the like, and baseband image and sound data is obtained. Then, the baseband image and sound data is supplied to the HDMI transmitting unit 726 and sent to an HDMI cable connected to the HDMI terminal 727.

Also, when image or sound data associated with still image data or moving image data directly output from the imaging signal processing circuit 754 or the sound signal processing circuit 756 is transmitted to the external device (the sync device), the image or sound data is supplied to the HDMI transmitting unit 726. Then, the image or sound data is sent to the HDMI cable connected to the HDMI terminal 727.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences or recording medium storing the program. As the recording medium, a CD (Compact Disc), an MD (MiniDisc), and a DVD (Digital Versatile Disk), a memory card, and a Blu-ray® disc can be used.

In addition, the effects described in the present specification are not limiting but are merely examples, and there may be other effects.

Additionally, the present technology may also be configured as below.

(1)

An interface circuit including:

a transmission circuit configured to perform transmission to another device through a transmission path; and a transmission direction reversal control unit configured to open the transmission path after making a request for reversal of a transmission direction in the transmission path to the other device, and to reverse the transmission direction at the transmission circuit in response to permission for reversal from the other device.

(2)

The interface circuit according to (1), wherein, while the transmission circuit transmits data to the other device, the transmission direction reversal control unit makes the request for reversal to the other device.

(3)

The interface circuit according to (1) or (2), wherein, when the request for reversal is received from the other device while the transmission circuit transmits data to the other device, the transmission direction reversal control unit makes the request for reversal to the other device.

(4)

The interface circuit according to any one of (1) to (3), wherein the transmission circuit includes an amplifier alternating-current connected to a differential input from the transmission path.

(5)

An interface circuit including:

a transmission circuit configured to perform transmission to another device through a transmission path; and a transmission direction reversal control unit configured to open the transmission path in response to a request for reversal of a transmission direction in the transmission path from the other device and, when the other device becomes accessible again, give the other device permission for reversal and reverse the transmission direction at the transmission circuit.

(6)

The interface circuit according to (5), wherein, while the transmission circuit receives data from the other device, the transmission direction reversal control unit receives the request for reversal from the other device.

(7)

The interface circuit according to (5) or (6), wherein, while the transmission circuit receives data from the other device, the transmission direction reversal control unit makes the request for reversal to the other device.

(8)

The interface circuit according to any one of (5) to (7), wherein the transmission circuit includes an amplifier alternating-current connected to a differential output to the transmission path.

(9)

A transmission system including:

a first device; and a second device, the first device and the second device performing transmission to each other through a transmission path, wherein the first device includes a first transmission circuit configured to perform transmission to the second device through the transmission path, and a first transmission direction reversal control unit configured to open the transmission path after making a request for reversal of a transmission direction in the transmission path to the second device, and to reverse the transmission direction at the first transmission circuit in response to permission for reversal from the second device, and the second device includes a second transmission circuit configured to perform transmission to the first device through the transmission path, and a second transmission direction reversal control unit configured to open the transmission path in response to the request for reversal from the first device, and, when the first device becomes accessible again, to give the first device the permission for reversal and to reverse the transmission direction at the second transmission circuit.

(10)

A transmission direction control method including:

a procedure of making a request for reversal of a transmission direction in a transmission path to another device that is a target for which transmission is performed from a transmission circuit through the transmission path;

a procedure of opening the transmission path; and a procedure of reversing the transmission direction at the transmission circuit in response to permission for reversal from the other device.

(11)

A transmission direction control method including:

a procedure of receiving a request for reversal of a transmission direction in a transmission path from another device that is a target for which transmission is performed from a transmission circuit through the transmission path;

a procedure of opening the transmission path; and when the other device becomes accessible again, a procedure of giving the other device permission for reversal and reversing the transmission direction at the transmission circuit.

(12)

A program for causing a computer to perform:

a procedure of making a request for reversal of a transmission direction in a transmission path to another device that is a target for which transmission is performed from a transmission circuit through the transmission path;

a procedure of opening the transmission path; and a procedure of reversing the transmission direction at the transmission circuit in response to permission for reversal from the other device.

(13)

A program for causing a computer to perform:

a procedure of receiving a request for reversal of a transmission direction in a transmission path from another device that is a target for which transmission is performed from a transmission circuit through the transmission path;

a procedure of opening the transmission path; and when the other device becomes accessible again, a procedure of giving the other device permission for reversal and reversing the transmission direction at the transmission circuit.

REFERENCE SIGNS LIST 10 disc player
20 audio amplifier
30 television receiver
101, 201 transition minimized differential signaling (TMDS) transmission circuit
111, 112, 211, 212 amplifier
113, 213 direct current bias circuit
114, 214 shield terminal
120, 220 plug connection detecting circuit
160, 260 in-phase signal communication circuit
170, 270 transmission direction reversal control unit
181, 281 processing unit
182, 282 EDID ROM
183, 283 display data channel (DDC) register
184, 284 selector
185 to 187, 285 to 287 driver
300 cable
310 to 330 TMDS channel
311 positive electrode signal line
312 negative electrode signal line
313 shield signal line
340 TMDS clock channel
350 display data channel (DDC)
351 SCL line
352 SDA line
361 consumer electronics control (CEC) line 362 utility line
363 HPD line
500 disk player
600 television receiver
700 digital camera

The invention claimed is:

1. An interface circuit, comprising:
a first register configured to store a first request flag;
a transmission circuit configured to transmit data to an external device via a transmission path; and
a transmission direction reversal control unit configured to:
set a second request flag in a second register of the external device to request reversal of a direction of transmission of the data in the transmission path;
open the transmission path based on the set second request flag;
detect a change in configuration of the external device, wherein the change in the configuration is detected based on a start of access of the first register by the external device within a specific time period; and
reverse the direction of the transmission of the data at the transmission circuit based on
the first request flag in the first register that is accessed by the external device, and
the detected change in the configuration of the external device, wherein the transmission circuit includes an amplifier alternating-current connected to a differential input from the transmission path.

2. The interface circuit according to claim 1, wherein the second request flag is set based on the transmission of the data via the transmission circuit to the external device.

3. The interface circuit according to claim 1, wherein the second request flag is set based on a reception of a request for the reversal of the direction by the external device during the transmission of the data to the external device.

4. An interface circuit, comprising:
a transmission circuit configured to:
transmit first data to an external device through a transmission path; and
receive second data from the external device; and
a transmission direction reversal control unit configured to:
detect a request flag in a register of the interface circuit for reversal of a direction of transmission of the first data in the transmission path, wherein
the request flag is set in the interface circuit by the external device during reception of the second data by the interface circuit from the external device,
the direction of the transmission of the first data in the transmission path is reversed from a first direction to a second direction,
the first direction is from the external device to the interface circuit for the reception of the second data by the interface circuit from the external device, and
the second direction is from the interface circuit to the external device for the transmission of the first data by the interface circuit to the external device;
open the transmission path based on the detected request flag; and
reverse the direction of the transmission of the first data at the transmission circuit based on a start of access of the register by the external device within a specific time period, wherein the transmission circuit includes an amplifier alternating-current connected to a differential input from the transmission path.

5. The interface circuit according to claim 4, wherein the transmission direction reversal control unit is further configured to receive a request for the reversal of the direction from the external device during the reception of the second data.

6. The interface circuit according to claim 4, wherein the transmission direction reversal control unit is further configured to transmit a request for the reversal of the direction to the external device during the reception of the second data.

7. A transmission system, comprising:
a first device; and
a second device, wherein
the first device includes:
a first register configured to store a first request flag;
a first transmission circuit configured to transmit first data to the second device through a transmission path; and
a first transmission direction reversal control unit configured to:
set a second request flag in a second register of the second device to request reversal of a direction of transmission of the first data in the transmission path;
open the transmission path based on the set second request flag;
detect a change in configuration of the second device, wherein the change in the configuration is detected based on a start of access of the first register by the second device within a specific time period; and
reverse the direction of the transmission of the first data at the first transmission circuit based on
the first request flag in the first register that is accessed by the second device, and
the detected change in the configuration of the second device, and
the second device includes:
a second transmission circuit configured to:
receive the first data from the first device through the transmission path; and
transmit second data to the first device through the transmission path; and
a second transmission direction reversal control unit configured to:
detect the second request flag for the reversal of the direction of the transmission of the first data in the transmission path;
open the transmission path based on the detected second request flag;
accept the detected second request flag based on an accessibility of the first device; and
reverse the direction of the transmission of the first data at the second transmission circuit based on the detected second request flag, wherein the transmission circuit includes an amplifier alternating-current connected to a differential input from the transmission path.

8. A transmission direction control method, comprising:
storing a first request flag in a first register;
transmitting data to an external device via a transmission path;

setting a second request flag in a second register of the external device to request reversal of a direction of transmission of the data in the transmission path;
opening the transmission path based on the set second request flag;
detecting a change in configuration of the external device, wherein the change in the configuration is detected based on a start of access of the first register by the external device within a specific time period; and
reversing the direction of the transmission of the data at a transmission circuit based on
the first request flag in the first register that is accessed by the external device, and
the detected change in the configuration of the external device, wherein the transmission circuit includes an amplifier alternating-current connected to a differential input from the transmission path.

9. A transmission direction control method, comprising:
in an interface circuit:
transmitting first data to an external device through a transmission path;
receiving second data from the external device;
detecting a request flag in a register of the interface circuit for reversal of a direction of transmission of data in the transmission path, wherein
the request flag is set in the interface circuit by the external device during reception of the second data by the interface circuit from the external device,
the direction of the transmission of the first data in the transmission path is reversed from a first direction to a second direction,
the first direction is from the external device to the interface circuit for the reception of the second data by the interface circuit from the external device, and
the second direction is from the interface circuit to the external device for the transmission of the first data by the interface circuit to the external device;
opening the transmission path based on the detected request flag;
and
reversing the direction of the transmission of the first data at a transmission circuit based on a start of access of the register by the external device within a specific time period, wherein the transmission circuit includes an amplifier alternating-current connected to a differential input from the transmission path.

10. A non-transitory computer-readable medium having stored thereon computer-executable instructions, which when executed by a computer, cause the computer to execute operations, the operations comprising:

storing a first request flag in a first register;
transmitting data to an external device via a transmission path;
setting a second request flag in a second register of the external device to request reversal of a direction of transmission of the data in the transmission path;
opening the transmission path based on the set second request flag;
detecting a change in configuration of the external device, wherein the change in the configuration is detected based on a start of access of the first register by the external device within a specific time period; and
reversing the direction of the transmission of the data at a transmission circuit based on
the first request flag in the first register that is accessed by the external device, and
the detected change in the configuration of the external device, wherein the transmission circuit includes an amplifier alternating-current connected to a differential input from the transmission path.

11. A non-transitory computer-readable medium having stored thereon computer-executable instructions, which when executed by a computer of an interface circuit, cause the computer to execute operations, the operations comprising:
transmitting first data to an external device through a transmission path;
receiving second data from the external device;
detecting a request flag in a register of the interface circuit for reversal of a direction of transmission of data in the transmission path, wherein
the request flag is set in the interface circuit by the external device during reception of the second data by the interface circuit from the external device,
the direction of the transmission of the first data in the transmission path is reversed from a first direction to a second direction,
the first direction is from the external device to the interface circuit for the reception of the second data by the interface circuit from the external device, and
the second direction is from the interface circuit to the external device for the transmission of the first data by the interface circuit to the external device;
opening the transmission path based on the detected request flag;
and
reversing the direction of the transmission of the first data at a transmission circuit based on a start of access of the register by the external device within a specific time period, wherein the transmission circuit includes an amplifier alternating-current connected to a differential input from the transmission path.

* * * * *